United States Patent
Oliveira et al.

(10) Patent No.: US 9,503,384 B1
(45) Date of Patent: Nov. 22, 2016

(54) ESTIMATING NETWORK CAPACITY AND NETWORK BANDWIDTH WITHOUT SERVER INSTRUMENTATION

(71) Applicant: ThousandEyes, Inc., San Francisco, CA (US)

(72) Inventors: Ricardo V. Oliveira, San Francisco, CA (US); Joao Antunes, San Francisco, CA (US)

(73) Assignee: ThousandEyes, Inc., San Fransisco, CA (US)

( * ) Notice: Subject to any disclaimer, the term of this patent is extended or adjusted under 35 U.S.C. 154(b) by 53 days.

(21) Appl. No.: 14/525,036

(22) Filed: Oct. 27, 2014

Related U.S. Application Data

(60) Provisional application No. 61/896,465, filed on Oct. 28, 2013.

(51) Int. Cl.
*H04L 12/26* (2006.01)
*H04L 12/805* (2013.01)

(52) U.S. Cl.
CPC ........... *H04L 47/36* (2013.01); *H04L 43/0876* (2013.01)

(58) Field of Classification Search
CPC .......................... H04L 47/36; H04L 43/0876
See application file for complete search history.

(56) References Cited

U.S. PATENT DOCUMENTS

| | | | |
|---|---|---|---|
| 7,180,858 B1 | 2/2007 | Roy et al. | |
| 7,545,749 B2 | 6/2009 | Jourdain et al. | |
| 7,675,856 B2 | 3/2010 | Padmanabhan et al. | |
| 8,503,320 B2 | 8/2013 | Ekelin et al. | |
| 8,619,602 B2* | 12/2013 | Begen | H04L 41/083 370/232 |
| 2006/0251104 A1* | 11/2006 | Koga | H04W 48/20 370/449 |
| 2011/0078237 A1* | 3/2011 | Nakamura | H04L 41/12 709/203 |
| 2011/0128864 A1 | 6/2011 | Chan et al. | |
| 2013/0176871 A1* | 7/2013 | Bertze | H04W 24/08 370/252 |
| 2014/0269401 A1* | 9/2014 | Gondi | H04L 43/0876 370/253 |

OTHER PUBLICATIONS

Author Unknown, Iperf, What is Iperf? Aug. 21, 2013 downloaded from http://web.archive.org/wetV20130821081255/http:I/iperf.fr/.
Mathis et al., Network Working Group, TCP Selective Acknowledgment Options, Sun Microsystems, Oct. 1996.

* cited by examiner

*Primary Examiner* — Phuc Tran
(74) *Attorney, Agent, or Firm* — Van Pelt, Yi & James LLP

(57) ABSTRACT

Accordingly, techniques for estimating network capacity of a path between two endpoints in a network without server instrumentation are disclosed. Techniques for estimating network bandwidth of a path between two endpoints in a network without server instrumentation are also disclosed. For example, techniques disclosed herein can be used for network capacity planning. As another example, techniques disclosed herein can be used for network availability troubleshooting (e.g., network degradation performance issues).

19 Claims, 8 Drawing Sheets

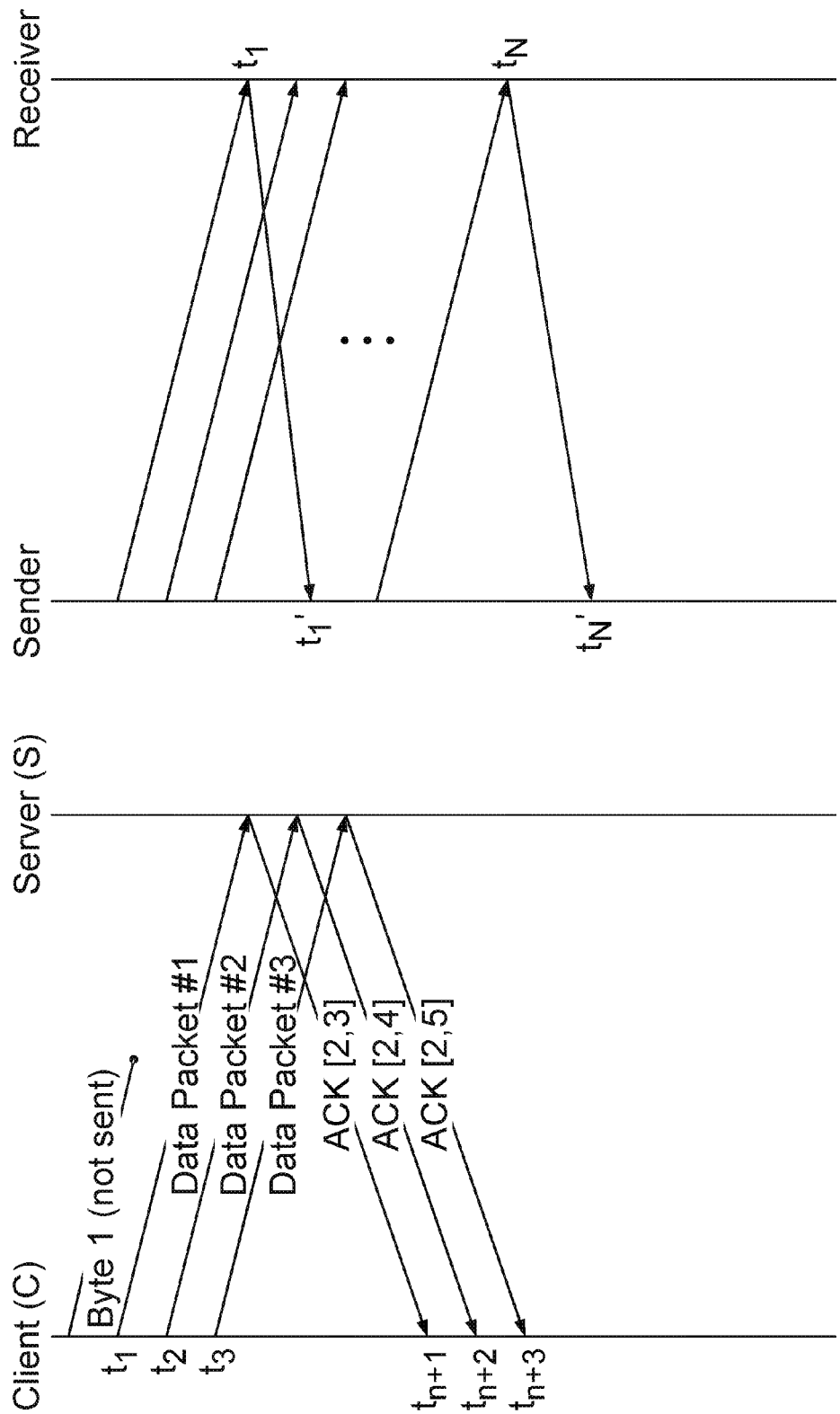

ESTIMATING NETWORK CAPACITY AND NETWORK BANDWIDTH WITHOUT SERVER INSTRUMENTATION

CROSS REFERENCE TO OTHER APPLICATIONS

This application claims priority to U.S. Provisional Patent Application No. 61/896,465, entitled CAPACITY AND BANDWIDTH ESTIMATION WITHOUT SERVER INSTRUMENTATION filed Oct. 28, 2013, which is incorporated herein by reference for all purposes.

BACKGROUND OF THE INVENTION

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers) on which the applications are executed. Various types of distributed applications can be provided as a cloud service or as a software as a service (SaaS).

BRIEF DESCRIPTION OF THE DRAWINGS

Various embodiments of the invention are disclosed in the following detailed description and the accompanying drawings.

FIG. 4 is a protocol diagram illustrating an example implementation of a network measurements agent using a TCP SACK option for performing network measurements without server instrumentation in accordance with some embodiments.

FIG. 5 is a protocol diagram illustrating an example implementation of a train of packets sent from a sender to a receiver for performing network measurements without server instrumentation in accordance with some embodiments.

DETAILED DESCRIPTION

Figure 1:
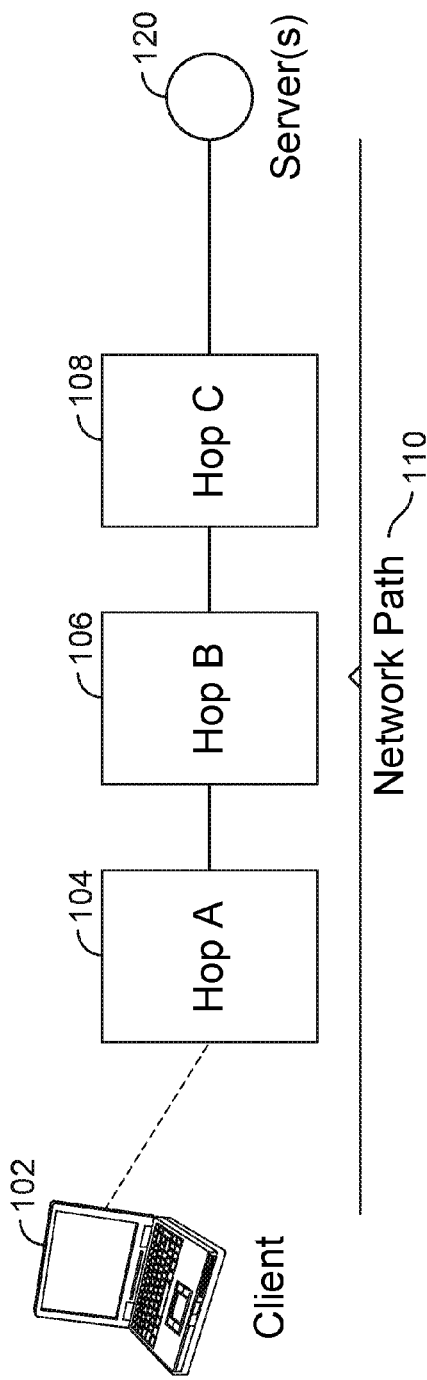
FIG. 1 is a block diagram illustrating an example network path for a client in communication with a server over a network in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers) on which the applications are executed. Various types of distributed applications can be provided as a cloud service or as a software as a service (SaaS).

A client device, such as a laptop or desktop computer or other computing device, can generally access a distributed application, which can be implemented using a cloud service or a SaaS, via a network, such as over the Internet. Performance of the distributed application can be affected by network performance issues.

Network Measurements in a Distributed Computing Environment

For example, a user can experience problems accessing and/or using a distributed application, such as slow response times and/or latency issues when using the distributed application. However, the user may not be able to determine whether such performance problems are associated with the distributed application or with network related issues. These and other problems associated with potential network performance and/or other network related issues that can arise in these network computing environments will now be discussed with respect to FIG. 1.

FIG. 1 is a block diagram illustrating an example network path for a client in communication with a server over a network in accordance with some embodiments. Client 102 is shown in communication with server 120 via network path 110 that includes multiple hops shown as Hop A 104, Hop B 106, and Hop C 108. For example, each of these hops can be a network device, such as a router, switch, gateway, firewall device, and/or other network device that can receive and forward packets from a source and destination in a network computing environment (e.g., TCP/IP compliant network devices, in which one or more of these hops may be network devices that are part of the Internet, part of the client's network computing environment, or part of the server's network computing environment). In some cases, the network path can change due to a route change for packets being sent between client 102 and server 120 (e.g., which can result in different hops and/or a different number of hops, etc.).

Network capacity generally refers to a maximum capacity of a link or a network path to send data from one location to another location in the network (e.g., from one endpoint to another endpoint in the network). For example, the network capacity for client 102 to send data along network path 110 to server 120 refers to the maximum capacity for client 102 to send data along network path 110 to server 120.

Network bandwidth generally refers to a maximum throughput (e.g., peak bit rate or useful bit rate) of a link or a network path to send data from one location to another location in the network (e.g., from one endpoint to another endpoint in the network). As such, available network bandwidth can vary based on other traffic using that link or network path. For example, the network bandwidth for client 102 to send data along network path 110 to server 120 refers to the maximum throughput for client 102 to send data along network path 110 to server 120, which can vary based on other traffic using network path 110 at any given time.

Measuring network capacity and/or network bandwidth of a path (e.g., network path) between two endpoints in the network can be used to determine network availability and/or performance problems. Existing techniques for measuring network capacity (e.g., also referred to as capacity) and network bandwidth (e.g., also referred to as available bandwidth) of a path between two endpoints in the network generally requires that both endpoints are instrumented (e.g., are executing software, such as agents, that can be used to perform network measurements between these two respective endpoints in the network).

Iperf is a commonly used network testing tool that is conventionally used for measuring throughput (e.g., using TCP data streams) of a network path. However, Iperf requires that both endpoints in the network be instrumented (e.g., both the client side and server side require instrumentation for iPerf to perform such measurements between these two endpoints). Another drawback of conventional tools, like Iperf, is that such tools require use of a specific port on the server side, which prevents other applications from using the same port (e.g., the Iperf process must be executing on the target server and cannot run concurrently with an application executing on the server as that Iperf process must exclusively use that port on the server and cannot reuse that same port concurrently with an application executing on the server). An example of this drawback is that Iperf cannot be used to measure the capacity or network bandwidth from a client to a Web server, because Iperf cannot use the same port as the Web server application on the target server (e.g., usually port 80).

However, measuring network capacity and/or network bandwidth of a path between two endpoints in the network is technically difficult to measure for distributed applications that are provided as a cloud service or as a SaaS, because typically there is no cooperation to instrument the server. For example, the cloud service or SaaS provider typically does not allow for agents or other instrumentation to be installed on their server(s) that could be used to facilitate such measurements by instrumenting both endpoints of a network path to facilitate measurements for determining the network capacity and/or network bandwidth of that network path.

What are needed are techniques for measuring network capacity of a path between two endpoints in a network (e.g., between a client and a server) without requiring instrumentation of both ends (e.g., no cooperation to instrument the server, such as a cloud service or SAAS service, such that measurements can be performed only from the client's endpoint).

In addition, what are needed are techniques for measuring available network bandwidth of a path between two endpoints in a network (e.g., between a client and a server) without instrumenting both ends (e.g., no cooperation to instrument the server, such as a cloud service or SAAS service, such that measurements can be performed only from the client's endpoint).

Another technical problem with performing network capacity and/or network bandwidth measurements for such distributed applications in network computing environments is how to perform such network capacity and/or network bandwidth measurements using network traffic that is application layer network traffic (e.g., using Transmission Control Protocol (TCP) packets directed to a given port for the distributed application executed on the server endpoint), so that such application layer network traffic is not blocked and/or throttled (e.g., by network devices, such as a firewalls).

Also, another technical problem with performing network capacity and/or network bandwidth measurements for such distributed applications in network computing environments is how to implement such network capacity and/or network bandwidth measurements without disrupting or otherwise affecting performance of the distributed application executed on the server provided by, for example, the cloud service and/or SaaS service.

Accordingly, techniques for estimating network capacity of a path between two endpoints in a network without server instrumentation are disclosed. Techniques for estimating network bandwidth of a path between two endpoints in a network without server instrumentation are also disclosed. For example, techniques disclosed herein can be used for network capacity planning. As another example, techniques disclosed herein can be used for network availability troubleshooting (e.g., network degradation performance issues).

In various embodiments, techniques are described for measuring end-to-end network properties, such as delay, jitter, loss, capacity, and available bandwidth of a path between two endpoints in a network (e.g., between a client and a server in a network computing environment, such as shown in FIG. 1). For example, the disclosed techniques can be performed without requiring instrumentation on both endpoints (i.e., instrumentation on both the client endpoint and the server endpoint is not required, such that these various network measurements can be performed by only using the client endpoint to perform such measurements). Also, the disclosed techniques can be performed with any application (e.g., a distributed application executed on a server, such as provided by a cloud service or SaaS) that communicates with clients using Transmission Control Protocol (TCP) packets. Moreover, the disclosed techniques can be performed using TCP to simulate typical application traffic from a network perspective (e.g., versus other conventional approaches that use Internet Control Message Protocol (ICMP) packets instead of TCP packets to perform such network measurements).

As such, in contrast to conventional tools like Iperf, techniques disclosed herein do not require instrumentation of the server side and can be implemented using TCP traffic that does not have throttling or other issues and follows a typical application path (e.g., using TCP traffic and not requiring a special/exclusive port, as such can use the port being used by the application executing on the target server). As further described below, the disclosed techniques are effective for estimating network capacity and network bandwidth for enterprise network environments that typically have symmetrical bandwidth for downlinks and uplinks to their data centers (e.g., so that the uplink is not flooded by smaller packet sized acknowledgements).

For example, depending on conditions of the network path, techniques described herein can require as few as 100 packets to compute an estimate of available bandwidth on a path, and by repeating over time, an estimate of the capacity on the path in the network can also be determined, as further described below. The disclosed techniques are also resilient to packet loss such that an accurate measurement can still be determined even if loss is on the order of, for example, 80%.

The Importance of End-to-End Network Metrics

Example network metrics include packet loss, delay, jitter, capacity, available bandwidth, and/or other network metrics as described herein. For example, real-time applications, such as voice-over-IP, video conferencing, and Virtual Desktop Infrastructure (VDI), are sensitive to network properties, such as jitter and packet loss.

As another example, network capacity and network bandwidth are important to understanding link utilization, and for planning and provisioning extra capacity for the network for delivery of distributed applications, for example, using a cloud service or SaaS. This can be of particular importance in cases where a user does not have control over the server (e.g., a cloud service, SaaS service, and/or other contexts in which server control or server instrumentation is unavailable or would be undesirable, as such SaaS providers may not allow for such instrumentation, such as Google cloud services, Apple cloud services, Salesforce.com, etc.), in which case new techniques are needed to determine these metrics, as further described below. These and other examples of the importance of various end-to-end network metrics are described herein.

Overview of Capacity and Available Bandwidth of a Path in a Network

Network capacity generally refers to a maximum capacity of a link or a network path to send data from one location to another location in the network (e.g., from one endpoint to another endpoint in the network). Network bandwidth (e.g., also referred to as available bandwidth) generally refers to a maximum throughput (e.g., peak bit rate or useful bit rate) of a link or a network path to send data from one location to another location in the network (e.g., from one endpoint to another endpoint in the network) in the presence of cross traffic (i.e., traffic generated from other locations in the network to and from either of the endpoints).

The available bandwidth of a path in a network between hosts A and B (e.g., such as between client 102 and server 120 as shown in FIG. 1) at a given time is the maximum throughput that B can receive data from A in the presence of cross traffic on the path in the network. The capacity of the path in the network between hosts A and B (e.g., such as between client 102 and server 120 as shown in FIG. 1) is the value of available bandwidth when the value of cross traffic is zero (i.e., when there is no cross traffic on the path in the network). In this case, the capacity generally only depends on the bottleneck link of the path. The value of available bandwidth is generally limited by the capacity of the link and cross traffic. The more cross traffic there is flowing on the path at a given time, the lower the value of available bandwidth at that given time.

Dispersion Rate as a Measurement of Available Bandwidth

Figure 2:
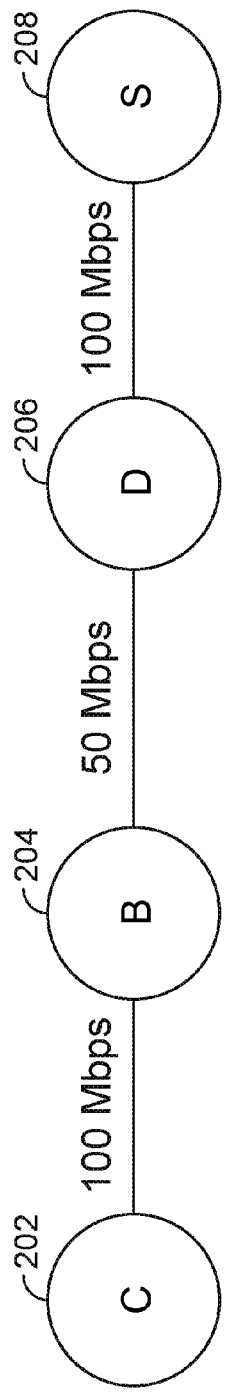
FIG. 2 is a block diagram illustrating an example network path for a client in communication with a server over a network showing a bottleneck link in accordance with some embodiments.

FIG. 2 is a block diagram illustrating an example network path for a client in communication with a server over a network showing a bottleneck link in accordance with some embodiments. As shown, a client (C) 202 is in communication with a server (S) 208 along a network path that includes two hops shown as a first hop (B) 204 and a second hop (D) 206. As also shown, the links from C-B and D-S are each 100 Mbps, but the link from B-D is only 50 Mbps. Thus, in this example network path, the link B-D is a bottleneck link.

For example, consider a client C and a server S, assuming the client sends a train of N packets to S at a given rate Sx, the packets will arrive at the server with a rate Rx, where Rx<=Sx. In this example, Rx refers to the dispersion rate.

As a first case, assume that there is no cross traffic on the network path for client C to server S. In this first case, if C is sending traffic (e.g., sending a train/sequence of packets) at the nominal interface speed, then the rate of the traffic will be throttled in the bottleneck link in the network path (e.g., the train of packets is sent back-to-back at the network interface's transmission speed; otherwise, it is not guaranteed to force queuing at the bottleneck link). As shown in FIG. 2, if client (C) 202 is sending a train of packets at 100 Mbps to server (S) 208, the packets are going to be queued at B, and sent at a smaller rate of 50 Mbps to D (e.g., link B-D is the bottleneck link in this network path example), and eventually arrive at server (S) 208 at a rate of 50 Mbps (Rx). Thus, Rx=50 Mbps will be the available bandwidth in this example.

Now consider the other case, assume that there is cross traffic on the network path for client C to server S. This case in which there is cross traffic is similar, except that now the available bandwidth will not be limited only by the bottleneck link or the capacity of the path, but also by the rate of the cross traffic present on the path (e.g., as similarly described above in the first case, it is assumed that the train of packets is sent back-to-back at the network interface's transmission speed; otherwise, it is not guaranteed to force queuing at the bottleneck link). For example, if there is a flow of 20 Mbps passing between B and D, the rate measured at the server will be 30 Mbps (Rx), which is the available bandwidth. Thus, Rx=30 Mbps will be the available bandwidth in this example.

Figure 3:
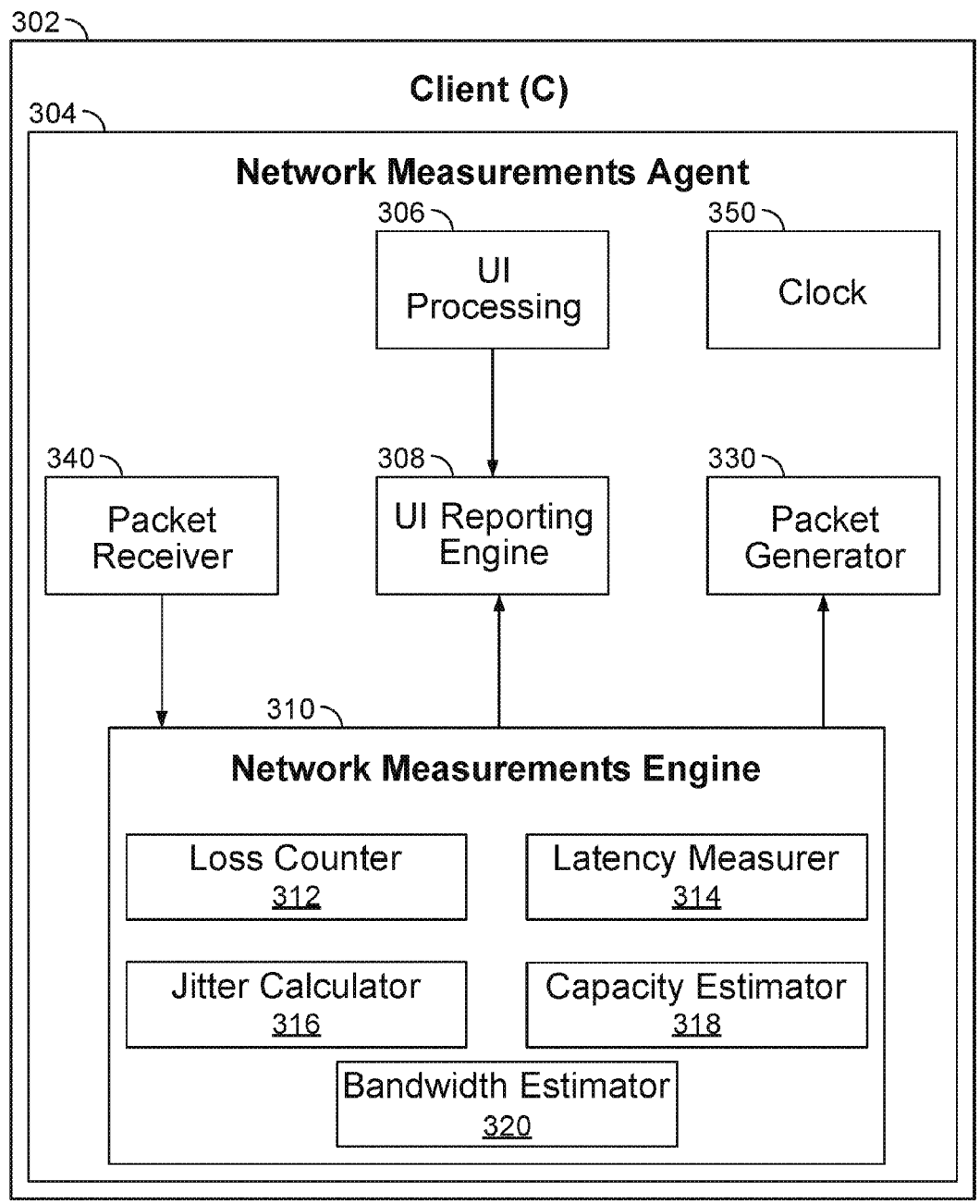
FIG. 3 is a block diagram illustrating an example implementation of a network measurements agent for performing network measurements without server instrumentation in accordance with some embodiments.

Network Measurements Agent for Performing Network Measurements without Server Instrumentation FIG. 3 is a block diagram illustrating an example implementation of a network measurements agent for performing network measurements without server instrumentation in accordance with some embodiments. As shown, a client (C) 302 can store and execute a network measurements agent 304. In one embodiment, network measurements agent 304 performs various network measurements without server instrumentation using various techniques disclosed herein.

As also shown in FIG. 3, network measurements agent 304 includes a component for processing user input (UI) shown as UI processing 306, a UI reporting engine 308, a packet generator 330, a packet receiver 340, and a network measurements engine 310. As also shown, network measurements agent 304 includes a clock 350 (e.g., clock 350 can obtain a local clock time for client (C) 302 to facilitate various network measurements performed by network measurements engine 310, such as further described below).

In one embodiment, network measurements engine 310 includes the following components: a loss counter 312, a latency measurer 314, a jitter calculator 316, a capacity estimator 318, and a bandwidth estimator 320. Each of the components of network measurements engine 310 and packet generator 330 and packet receiver 340 will be described in further detail below with respect to FIGS. 4-10.

In one embodiment, whenever network measurements agent 304 is described as performing a task, a single component, a subset of components, or all components of network measurements agent 304 may cooperate to perform the task. Similarly, whenever a component of network measurements agent 304 is described as performing a task, a subcomponent may perform the task and/or the component may perform the task in conjunction with other components. For example, packet generator 330 and/or packet receiver 340 can be implemented as components of network measurements engine 310. Depending on factors such as the amount of computing resources available to network measurements agent 304, various logical components and/or features of network measurements agent 304 may be omitted and the techniques described herein adapted accordingly. Similarly, additional logical components/features can be added to network measurements agent 304 as applicable.

Client-Side Techniques for Measuring Loss, Delay, and Jitter of a Path in a Network Techniques for measuring loss, delay, and jitter of a path in a network between two endpoints without instrumenting both endpoints will now be disclosed. In one embodiment, techniques for measuring loss, delay, and jitter of a path in a network between two endpoints can be implemented using network measurements agent 304 executed on client (C) 302.

A first technique for performing these measurements is implemented utilizing TCP Selective Acknowledgements (SACK) as described below with respect to FIG. 4. The TCP SACK options are specified in IETF RFC 2018.

FIG. 4 is a protocol diagram illustrating an example implementation of a network measurements agent using a TCP SACK option for performing network measurements without server instrumentation in accordance with some embodiments. As shown, a client (C) sends a sequence of TCP packets to a server (S).

In one embodiment, this technique is performed by sending data packets (e.g., TCP data packets can be sent from network measurements agent 304 using packet generator 330) and receiving responses (e.g., TCP acknowledgment (ACK) packets in response to each of the probe packets, in which such packets can be received by network measurements agent 304 using packet receiver 340). In this example implementation, the above-described TCP Selective Acknowledgements (SACK) option is used to facilitate matching up the packets sent from client (C) (e.g., the TCP Data packets, also referred to as probe packets in this example) with the responsive packets received from server (S) (e.g., the TCP ACK packets).

In particular, a TCP connection can be opened and sustained between these two endpoints (e.g., client (C) and server (S) in this example as shown in FIG. 4) with a hole in the sequence number space by not sending the first packet (e.g., byte 1 is not sent as shown in FIG. 4). As will be apparent, the initial TCP handshake to set-up the TCP connection between the client (C) and the server (S) is not shown in FIG. 4 but would be well known to one of ordinary skill in the art. In this example, the packets being sent have only 1 byte of payload. Referring to FIG. 4, byte 1 is not sent as shown in FIG. 4 to open a hole in the TCP sequence number of this train of packets, and then the following packets are sent from client (C) to server (S) in which data packet #1 includes byte 2, data packet #2 includes byte 3, and data packet #3 includes byte 4. In this example, server (S) supports the TCP SACK options and, thus, sends ACK packets that each specify the bytes received in this TCP sequence of packets for this TCP connection. As shown, the following ACK packets are sent from server (S) to client (C): ACK [2,3] which can be matched up with data packet #1, ACK [2,4] which can be matched up with data packet #2, and ACK [2,5] which can be matched up with data packet #3, in which this matching of the ACK packets to the data packets can be determined based on the new byte that is acknowledged as being received by the server (S) (i.e., the unique byte of the sequence number space present in SACK option between two TCP ACK responses).

In one embodiment, a train of N packets is sent (e.g., one packet can be sent at a time to send a train of N packets from one endpoint, such as client (C), to another endpoint, such as server (S), such as shown in FIG. 4). As further described below, packet loss, Round Trip Time (RTT), and jitter (e.g., mean deviation of RTT) can then be measured based on the received packets received in response to the train of N packets. In this example implementation, the outgoing packets (e.g., TCP request packets) can be matched with the incoming packets (e.g., TCP ACK packets) using the selective acknowledgement (SACK) field in the incoming TCP packets, which is facilitated by opening a hole in the TCP packet sequence as described above (e.g., by not sending all of the bytes of data, such as not sending byte 1 as shown in FIG. 4). In some cases, one packet can be sent at a time to ensure that the bottleneck link in the path (e.g., if a bottleneck link is present in the network path) is not saturated; otherwise, this may just be measuring an increasing jitter due to an increase in the queue sizes at the saturated link.

In one embodiment, loss for the network path can be determined by counting the number of missing acknowledged (ACK) packets (e.g., in which the number of expected ACK packets should equal the number of sent request (Req) packets). For example, if 50 request packets are sent, and only 49 ACK packets are received, then the loss is one in this example. As another example, if 50 request packets are sent, and only 47 ACK packets are received, then the loss is three in this example. In an example implementation, loss counter 312 of network measurements engine 310 can compute the loss for the network path using packet generator 330 and packet receiver 340 to implement the above-described technique for determining loss for the network path.

In one embodiment, Round Trip Time (RTT) for the network path can be measured using a local clock to measure the RTT for each data packet and each matched up acknowledged (ACK) packet using the above-described SACK-based technique for matching the request and ACK packets. Referring to FIG. 4, using a local clock of client (C), the time at which each data packet is sent is stored (e.g., Data Packet #1 was sent at $t_1$, Data Packet #2 was sent at $t_2$, and Data Packet #3 was sent at $t_3$), and, similarly, the time at which each acknowledged (ACK) packet is received is stored (e.g., ACK [2,3] is received at $t_{n+1}$, ACK [2,4] is received at $t_{n+2}$, and ACK [2,5] is received at $t_{n+3}$). Also, in some cases, the ACK packets may be returned out of order, which is handled by implementing the above-described SACK-based matching technique. The RTT for each matched up packet can then be computed by calculating the difference in the time from when the acknowledged packet was received by client (C) from the time that the corresponding data packet was sent from client (C). In this embodiment, server (S) is not instrumented, so the time at which data packets are received by server (S) and the time at which acknowledged packets are sent from server (S) are not known.

In one embodiment, latency (e.g., delay) for the network path can then be determined by calculating the average RTT based on the measured RTT for each of the matched up packets. For example, assuming that 49 request/ACK TCP packets have been successfully matched up in which there was a loss of just one packet in a train of 50 request packets sent from client (C) to server (S), then the latency is determined by computing the average calculated RTT, which is the average of the RTT for the matched up 49 request/ACK TCP packets in this example. In an example implementation, latency measurer 314 of network measurements engine 310 can compute the latency (e.g., delay) for the network path using packet generator 330, packet receiver 340, and clock 350 (e.g., clock 350 can obtain a local clock time for client (C) 302) to implement the above-described techniques for determining latency for the network path.

Jitter generally refers to the variation in latency as measured in the variability over time of the packet latency across a network. As such, a network with constant latency has no variation and, thus, has no jitter. Packet jitter is generally computed as an average of the deviation from the network mean latency. In this example, jitter for the network path can then be calculated as the mean deviation of the RTT. In an example implementation, jitter calculator 316 of network measurements engine 310 can compute the jitter for the network path using the measured latency (e.g., measured using latency measurer 314, such as described above).

In many cases, the above-described TCP SACK-based technique for performing the latency measure may be preferable, because it only requires a single TCP connection to the server, whereas the below-described SYN technique can sometimes be mistakenly identified as a SYN flooding TCP attack and/or can trigger various blocking/throttling rules in network devices on the network path (e.g., firewalls and/or intrusion detection systems). Another advantage of using the SACK method is that measurements are performed in the context of a single flow (5-tuple: source IP address, destination IP address, source port, destination port, and protocol), which means packets are very likely to follow a unique path in the network even in presence of ECMP (Equal-Cost Multi-Path Routing). Another advantage of using the above-described SACK-based technique is that measurements are performed in the context of a single flow (5-tuple source IP address, destination IP address, source port, destination port, and protocol), which means packets are likely to follow a unique path in the network even in presence of ECMP (Equal-Cost Multi-Path Routing).

However, if a target server does not support the TCP SACK option, then TCP SYN packets can be sent, and the server replies with a SYN-ACK for each sent packet. In particular, a series of SYN packets can be sent from the client to the server. In this case, SYN-ACK responses sent from the server can be matched up with the TCP SYN packets using the 4-tuple (source IP address, destination IP address, source port, and destination port). As such, the 4-tuple of the SYN-ACK packets are used to match up each SYN request with its corresponding SYN-ACK response. In some cases, instead of sending a SYN-ACK packet in response to a SYN packet, the server can respond with a RST (reset) packet, so such responses can similarly be matched up with the corresponding SYN packet using the same mechanism described above. Loss can then be similarly determined based on a count of the number of response packets (e.g., TCP SYN-ACK and/or RST packets) received by the client from the server relative to the number of TCP SYN packets sent from the client to the server. The successfully matched up TCP SYN and TCP SYN-ACK (and/or RST) packets can then be similarly used to calculate RTT and jitter as similarly described above with respect to the SACK-based technique. In an example implementation, after each SYN packet has been sent to the server, a RST packet can be sent from the client to the server to clean up a state on the server for this TCP connection (e.g., to avoid impacting or otherwise affecting application performance, such as performance of the target application executed on the target server). Therefore, the SYN method never really opens a TCP connection since the client never completes the TCP three-way handshake.

When the server sends a response packet (e.g., a TCP SYN-ACK packet), the packet header may also include the Maximum Segment Size (MSS) field to provide the MSS value that the server supports as part of an initial handshake for a TCP connection set-up, in either the TCP SACK-based approach or the TCP SYN-based approach, the MSS supported by the server is recorded as part of the measurement.

In one embodiment, a Maximum Transmission Unit (MTU) is determined. For example, the MTU, which is at layer-2, is typically 1500 bytes for Ethernet (or 9000 bytes if Jumbo Frames are used), such that frames can have a maximum size of 1500 bytes. However, a standard IP header is 20 bytes and a standard TCP header is 20, so a common MSS payload is typically 1460 bytes (e.g., 1500 bytes minus 20 bytes that is subtracted for the IP header and minus 20 bytes that is subtracted for the TCP header). In another example, if the connection is performed over IP version 6 (IPv6), a similar calculation is performed to determine the MTU, although taking into account the larger size of an IPv6 header (i.e., at least 40 bytes, plus any optional Extension Headers).

In one embodiment, a Path MTU (PMTU) discovery is performed using well-known PMTU discovery techniques to determine the MTU that is the max MTU size for a network path between client and server. For example, if on a given path from client (C) to server (S), a minimum MTU of 1300 bytes is on the link from hop A to hop B on that path, then the PMTU for client (C) to server (S) would be 1300 bytes. Generally, in a worst case scenario, PMTU for a given network path would typically be determined after N attempts for a network path that includes N number of hops, assuming each next hop reports a lower MTU value (e.g., in which the MTU value can be reported by an ICMP Fragmentation Needed (or ICMP version 6 Packet Too Big) from the next hop.

These measurements, such as the determined jitter, MSS, and MTU values, can be used for the operations for determining capacity and bandwidth as will be further described below.

Client-Side Techniques for Estimating Capacity of a Path in a Network

Client-side techniques to estimate capacity will now be described. For example, client-side techniques can measure the capacity based only on measurements performed at the client side (e.g., using network measurements agent 304 executed on a processor of client 302). In this example, server-side cooperation is not required (e.g., the target server does not require instrumentation, such that an agent need not be also executing on the server). The disclosed client-side techniques can be performed with any network protocol that is supported by the server that acknowledges the reception of data (e.g., TCP, ICMP, specific cases of UDP, and/or other such network protocols).

In one embodiment, a client-side technique to estimate available bandwidth is performed using the following: a 5-tuple of source IP, destination IP, source port, destination port, and protocol (e.g., to account for ECMP (Equal Cost Multipath Routing)), jitter, and MTU (Maximum Transmission Unit). For example, jitter for a network path can be determined using the above-described techniques for measuring jitter using client-side techniques.

For example, the probing technique for estimating capacity of a path in a network can use the largest size of packet (e.g., MTU, which is 1500 bytes for layer-2 Ethernet frames), which can be used for the following reasons: 1) by transmitting more data per packet, less packets can be sent to achieve a certain rate, allowing the client to send at faster rates and, thus, forcing queuing at the bottleneck link (e.g., if a bottleneck link is present on the given network path between the client and the server); and 2) because the response packet acknowledging data (e.g., hereafter referred to simply as an ACK packet) for each 1500-byte packet is very small, the chance of the ACK packet getting queued on the way back to the client is reduced. In fact, it can be shown that if ACK packets are 40 bytes in size, then the capacity of the path on the way back to the client needs to be lower than C×(40/1500) to originate queuing and become itself a bottleneck, where C is the capacity of the network path from the client to server.

In one embodiment, the capacity can be computed as follows: the total number of packets that received an ACK packet times the size of the sent packets (MTU) divided by the difference in time between the arrival of the first packet (e.g., $t_1$) and the last packet ($t_N$), such as further described below with respect to FIG. 5. The assumption is that loss is created by congestion on the way to the server, and not by lost ACK packets on the way to the client, because it is the client that is saturating the link by sending large packets in a short burst (e.g., as fast as possible). Therefore, it can be assumed that all ACK packets received by the client correspond to the same number of probes received by the server in the given timespan.

In one embodiment, the dispersion interval $\Delta t$ is measured at the client side as follows:

$$\Delta t' =$$

$$t'_N - t'_1 = (t_N + \overline{d} + \delta_N) - (t_1 + \overline{d} + \delta_1) = (t_N - t_1) + (\delta_N - \delta_1) = \Delta t + \Delta \delta$$

or $$\frac{\Delta t}{\Delta t'} = 1 - \frac{\Delta \delta}{\delta t'} \simeq 1 \text{ for } |\Delta \delta| \ll \Delta t'$$

In the above equations, $\overline{d}$ is the average one-way delay from the server to the client and the one-way jitter for packet x. Because the one-way jitter cannot be exactly measured given that there is not access to the server (e.g., server control or server instrumentation for performing such measurements), this is not known. However, its statistical distribution can be determined. For example, if we make $\Delta \delta = \delta_x - \delta_y$, and we assume $\delta$ follows a normal distribution with zero mean (e.g., common assumption in modeling network jitters), then $\Delta \delta$ will also follow a normal distribution with zero mean and variance given by, for example, the following:

$$\sigma(\Delta \delta)^2 = \sigma^2 + \sigma^2 = 2\sigma^2$$

Therefore:

$|\Delta \delta| < 2\sqrt{2}\sigma$ with 95% probability for a normal distribution so the following can be safely determined:

$$\Delta t' \gg |\Delta \delta| \iff \Delta t' > k|\Delta \delta| \iff \Delta t' > k2\sqrt{2}\sigma \quad \text{(Equation 1)}$$

where the last equation holds with 95% probability, k controls how much $\Delta t'$ needs to be larger than $|\Delta \delta|$.

Therefore, after a value for k is fixed, and given the standard deviation of the jitter ($\sigma$), a stream of N back-to-back packets can be sent and $\Delta t'$ can be measured, and whether it is within the confidence interval established can be verified. In one embodiment, the process starts by sending a stream of 100 MTU-sized packets (e.g., a burst of 100 packets that are each 1500 bytes in size, including the 40 bytes allocated for the TCP and IP headers in the frame as discussed above), such as further described below with respect to FIG. 5.

For high-speed connections (e.g., 1 Gbps or higher), the measured dispersion may be very small (e.g., <2 ms), and below the threshold of Equation 1. In other cases, the connection may have a very high jitter that will require a higher dispersion value. The way to increase the dispersion value so that it is above the threshold of Equation 1 can be addressed by sending streams with a larger number of packets, such as further described below with respect to FIG. 5. So, if the obtained dispersion rate is still below the threshold, the next stream contains, for example, five times more packets than the previous (e.g., or some other larger number of packets). Therefore, if the dispersion rate of the initial stream of 100 packets is not large enough, a larger stream of 500 packets can be sent. This process can be repeated until the required dispersion time is achieved or a maximum number of packets is sent (e.g., typically allowing three streams of 100, 500, and 2500 packets respectively to be sent). This active probing technique for estimating a capacity measurement of a path in a network is further described below with respect to FIG. 5.

FIG. 5 is a protocol diagram illustrating an example implementation of a train of packets sent from a sender to a receiver for performing network measurements without server instrumentation in accordance with some embodiments. In one embodiment, a client-side technique to estimate available bandwidth is performed by using a probe approach that includes sending a train of packets of MTU size (e.g., 1500 bytes including the TCP and IP header sizes as discussed above), such as shown in FIG. 5. In an example implementation, after an initial TCP connection handshake to establish a TCP connection between a sender (e.g., client (C)) and a receiver (e.g., server (S)), a first number of packets, for example, 100 packets (e.g., or some other number of packets), can be sent from a sender (e.g., client (C)) to a receiver (e.g., server (S)). The objective of sending a train of MTU-sized packets from the sender to the receiver is to attempt to saturate the path in order to estimate a capacity measurement between the client and the server on this path of the network.

Referring to FIG. 5, $\Delta t'$ is measured by subtracting $t_1'$ from $t_N'$. In an example implementation, whether $\Delta t'$ is large enough relative to the previously computed jitter value for the network path is determined. The rationale for preferring that the $\Delta t' \gg$ jitter for the network path is to ensure that the jitter on the network path does not have too significant of an impact on the $\Delta t'$ value that is measured using the above-described technique of sending, in this example, a train of 100 MTU-sized packets (e.g., or some other number of packets) on the network path (e.g., does not distort or otherwise materially impact the result for the measured $\Delta t'$).

If the measured $\Delta t'$ exceeds the relative threshold such that $\Delta t' \gg$ jitter, then the train of 100 packets of MTU size was sufficient for computing the $\Delta t'$ value. If not (e.g., $\Delta t'$ does not exceed the relative threshold), then a train of a larger number of packets, such as 500 packets (e.g., or some other number of packets), can be sent and the above process can be repeated to measure a new $\Delta t'$ and verify that the $\Delta t'$ exceeds the relative threshold such that $\Delta t' \gg$ jitter. If the new $\Delta t'$ fails to exceed the relative threshold again, then a train of a larger number of packets, such as 2500 packets (e.g., or some other number of packets), can be sent and the above process can be repeated to measure a new $\Delta t'$ and verify that the $\Delta t'$ exceeds the relative threshold such that $\Delta t' \gg$ jitter. In some cases, if the new $\Delta t'$ again fails to exceed the relative threshold, then it can be determined that there is too much jitter on this network path such that these client-side techniques may not be effectively applied for estimating capacity between this client and this server (e.g., as such number of packets and volume of data may be excessive for testing purposes, and/or can have other negative implications on network devices along the network path, etc.). In some cases, if jitter was determined to be high, then the above-described probing technique can be initiated with a higher number of packets for pre-optimization of this probing technique (e.g., start by sending a train of 500 packets of MTU size instead of initially sending a train of 100 packets of MTU size).

In one embodiment, capacity can be estimated using the following calculation: capacity=$(N \times MTU)/\Delta t'$. In this calculation, N is the number of packets sent in the train of packets sent using the above-described probing technique (e.g., 100, 500, 2000, or some other value may be used as described above), MTU is the MTU size used for each of the packets in the above-described probing technique, and $\Delta t'$ is the value measured using the above-described probing technique as shown with respect to FIG. 5 and discussed above (e.g., $\Delta t'$ measures a difference in a $t_1'$ time that the first acknowledge packet arrives at the client from the server and a $t_N'$ time that a last acknowledge packet is received at the client from the server, and wherein the $t_1'$ time and the $t_N'$ time are measured using the same local clock of the client).

Based on empirical observations of using the above-described probing techniques on actual networks to measure capacity between two endpoints, such as between a client and a server, on a given network path and sending such a fast streams of packets (e.g., sending a burst stream of 100 packets, such as using 12 microsecond intervals, at 1 Gb/s), these packets tend not to be disrupted by cross traffic (e.g., as such bursts typically would be performed without impact of cross traffic, which is typically more dispersed over time, such that short bursts of such probe traffic typically falls in gaps of any such cross traffic). As such, the above-described probing techniques typically provide an effective and accurate client-side technique for estimating a capacity measurement between the client and the server on a given network path. For example, to obtain an accurate estimate of path capacity, multiple measurements of point capacity can be performed over a window of time, and the maximum of these measurements can be selected as the estimated path capacity (e.g., the correct path capacity).

In an example implementation, capacity estimator 318 of network measurements engine 310 can implement these client-side techniques for estimating capacity of a path in a network using packet generator 330, packet receiver 340, and clock 350 (e.g., clock 350 can obtain a local clock time for client (C) 302), such as described above and further described below.

Client-Side Techniques for Estimating Available Bandwidth Using TCP of a Path in a Network The above-described probing techniques include sending a train of data packets that can generally involve sending a significant amount of data (e.g., a train of 2500 packets of 1500 bytes each can amount to 3.85 MB of traffic data, including the responses from the server) from the client to the server on a given network path. As such, this issue can be addressed when applying these techniques using TCP as will now be described.

In one embodiment, in order for the above-described client-side techniques for estimating capacity of a path in a network to be implemented using TCP, techniques for sending N back-to-back packets to the server and receiving N packets back are described below. For example, this can be implemented by performing the following: 1) opening a TCP connection with the server; 2) opening a hole in the sending sequence number space (e.g., typically by not sending one byte of data in the sequence number space); and 3) advancing the sequence number only one byte on each packet sent. For example, this technique ensures that the data (e.g., train of packets of data) is not sent to the application layer and, thus, does not impact the application executed on the target server (e.g., because of the gap/hole in the sequence number space, such data would be buffered in TCP buffers but would not be sent to the application due to the hole in the data for this TCP connection), and also ensures that the TCP buffer on the receiving end only grows one byte per packet, keeping it small.

As similarly described above, for each packet the server receives, an ACK packet is sent from the server to the client. After receiving all of the ACK packets (e.g., or a timeout expires), the connection can be closed. In one embodiment, to complete the probe testing and clean-up the TCP connection in this example embodiment, a FIN packet can be sent from the client to the server, the server then sends FIN-ACK, and the client then sends a SYN-ACK at an end of the TCP connection to clean-up the TCP connection. As such, this approach does not impact the performance of the application executed on the server but still provides an accurate estimate for a capacity measurement for application network performance between the client and the server without requiring server instrumentation.

For example, being able to work with TCP off the box without any server modification (e.g., without requiring server control or server instrumentation) is important, because a) it ensures packets are sent through the same paths as real traffic such as HTTP traffic, which is not necessarily the case with ICMP traffic; b) it ensures that such traffic is not throttled, which happens more frequently with ICMP; and c) it ensures packets on the way to the server are much bigger than ACK packets being sent back to the client, which decreases the chances of the ACK packets being queued at a link in the network path.

Working with ICMP

For cases where the target is a network device (e.g., as opposed to a server), it is possible that there will not be a TCP port open on such a target. In this case, ICMP echo requests can be used to generate replies from the server. A caveat of this scheme is that because the size of the ICMP echo responses are comparably the same size as the ICMP echo requests sent, a bottleneck link on the way back to the client may be saturated instead (even though the receiving rate should always be less or equal than the sent rate). So, in the ICMP case, it cannot be guaranteed that the measured capacity/available bandwidth is on the client-to-server path. Generally, the measured capacity/available bandwidth in this case is min(B_cs, B_sc), where Bc-s is the bandwidth from the client to the server and Bs-c is the bandwidth from the server to the client.

Measuring Path Capacity Using Client-Side Techniques

In one embodiment, path capacity is measured by keeping track of the maximum of several capacity measurements over a recent window of data. The rationale is that the only way to measure capacity is when there is no cross-traffic affecting the measurements, and therefore, if a long enough window of time is used, there should be at least one sample of point capacity where the amount of cross-traffic is very small. That sample is when the available bandwidth has a local maximum. In some cases, it is also important to refresh capacity at each sample of available bandwidth, because there can be cases where there is a change in the path that decreases (or increases) capacity.

In one embodiment, an estimated capacity is determined periodically by performing the above-described client-side techniques for estimating capacity of the path in the network (e.g., at configurable intervals, such as every five minutes, every hour, or other time interval(s)).

In one embodiment, an estimated capacity of the path in the network is determined based on a computation of a series of capacity estimates over a period of time (e.g., a day, an hour, or some other time interval(s)). For example, the estimated capacity can be determined based on the 80th percentile of a last 10 capacity estimate measurements (e.g., or some other percentile, average, or other computed metric based on a computation of a series of capacity estimates over a period of time can be used as will now be apparent to one of ordinary skill in the art). In an example implementation, the last ten capacity estimate measurements can be used from the last 24 hours, which can be referred to as the day capacity (e.g., to avoid path changes over days that can result in significant differences in these capacity estimate measurements over time). Also, the last ten capacity estimate measurements can be used from the last hour, which can be referred to as the hour capacity.

In one embodiment, an 80th percentile (e.g., the second highest capacity estimate measurement over the last ten capacity estimate measurements can be used to calculate the capacity estimate using the 80th percentile, or some other percentile can be used) of the last hour (hour capacity) can also be determined, and if a difference between a determined 80th percentile day capacity and 80th percentile hour capacity values is greater than a threshold value, then the last day capacity estimate measurements can be discarded, and the estimated capacity of the path in the network for that day capacity can be set to be equal to the hour capacity (e.g., the capacity estimate is refreshed in this example, so that we need not wait another day to get to new capacity value).

In an example implementation, two windows are used to compute capacity: 1) a small window of 10 values typically spanning the last hour (e.g., referred to as hour capacity); and 2) a larger window of the last 24 hours (e.g., day capacity). For example, the 80-percentile can be computed on both windows (e.g., the $80^{th}$ percentile hour capacity and the $80^{th}$ percentile day capacity). If the ratio of the difference between the two is more than 50%, then the 24-hour window can be reset (e.g., refreshed) to start over (e.g., and maintain the small window). For example, the use of the small window can be used to filter some noise that can happen with the measurements, whereas the larger 24-hour window is useful to filter daily traffic patterns.

Below is an example threshold that can be computed as a threshold to determine whether to refresh capacity estimate measurements that can be used to determine that new capacity estimate measurements should be performed (e.g., as a path change or other changes may have caused significant differences in results for recent capacity estimate measurements).

$$\text{Abs}(\text{hourCap}-\text{dayCap})/\max(\text{hourCap},\text{dayCap}) \geq 0.5$$

In this example implementation, if the above threshold is exceeded, then the last day of capacity estimate measurements are discarded, and the capacity estimate is computed using newly determined capacity estimate measurement points (e.g., this is to safeguard against variations in capacity estimate measurements that may result from route changes, etc.).

These above-described client-side techniques for estimating capacity of a path in a network facilitate providing an accurate capacity measurement estimate for a given network path between a client and server using client-side measurement techniques that is not impacted significantly by cross traffic.

In an example implementation, capacity estimator 318 of network measurements engine 310 can implement these client-side techniques for estimating capacity of a path in a network using packet generator 330, packet receiver 340, and clock 350 (e.g., clock 350 can obtain a local clock time for client (C) 302), such as described above and further described below.

Measuring Bandwidth from a Server to a Client

The above-described scheme measures the capacity from the client to the server. However, in enterprise networks (e.g., enterprise WAN MPLS networks), the links are often symmetrical, so the capacity from A to B should be the same as from B to A.

However, the same may not be the case for available bandwidth. For instance, if A is a branch office and B is a data center, then there is usually more traffic flowing from B to A rather than the opposite direction. The situation differs in the case of residential Internet access (e.g., cable, DSL, or other residential Internet access network options) where the upstream capacity is usually much smaller than the downstream capacity.

Overview of Example Algorithm for Estimating Available Bandwidth from a Server to a Client An example algorithm is shown below and described below for estimating bandwidth from a server to a client without requirement server instrumentation.

Smin = 0
Smax = capacity
Sx = capacity (e.g., rate at which packets are sent from the client to the server)

-continued

```
accurate_estimation_window is a ratio of the capacity, e.g., 10%
Rx is the dispersion rate measured at the client side (e.g., rate at which
packets received)
Loop:
    send a train of packets at Sx
        if Rx = Sx, we update Smin = Rx
        else Rx < Sx, we update Smax = Rx
    update estimation window = (Smax - Smin)/capacity
    if estimation_ window +21 accurate_estimation_window
        return avail_bw = (Smax - Smin)/2
        else update Sx = (Smax - Smin)/2
```

In some cases, the loop of the above-described algorithm can break if it has been run for more than a specified amount of time (e.g., 10 seconds) or if sending the next train of packets exceeds the maximum amount of allowed traffic (e.g., 5,000 packets). If the loop breaks and the estimation_window is smaller than acceptable_estimation_window, then the current estimation (avail_bw=(Smax−Smin)/2) can be returned.

The above-described client-side technique for estimating bandwidth of a path in a network from a server to a client allows for a determination of the maximum rate at which packets can be sent from the client to the server such that the packets are returned at the same rate within an approximate estimate range (e.g., by recursively performing the above loop to determine this bandwidth estimate that is a threshold of, for example, within 10% of capacity or some other threshold value).

Size of the Train of Packets

At each iteration, the size of the train of packets is calculated based on the desired Sx and on how many network packets, ours and cross-traffic (e.g., referred to as the target_traffic_window)), can "fit" during the transmission of the sent train of packets. In an example implementation, the train of packets is calculated using the following: train_packets=(Sx/capacity)×target_traffic_window. In particular, the approach used in this example implementation is to calculate the minimum of packets a train should have so that given the rate at which is sent (Sx) there can be target_traffic_window packets (target window of packets) between the first and the last packets of the train.

As an example, if the capacity rate is 500 Mbps and to allow for a window of 100 packets of traffic, to send the stream at capacity rate, the stream should contain 100 packets. On the other hand, if the stream is to be sent at 100 Mbps, then the stream should be composed of 20 packets which will allow for 400 Mbps of cross-traffic.

As similarly discussed above with respect to capacity estimate measurements, these bandwidth estimate measurements can similarly be repeated over time, for example, every five minutes (e.g., or every one hour or some other time interval).

In an example implementation, bandwidth estimator 320 of network measurements engine 310 can implement these client-side techniques for estimating capacity of a path in a network using packet generator 330 and packet receiver 340.

These techniques can be applied to distributed applications (e.g., cloud-based or SaaS based services) or other applications for which there is no access and/or cooperation to instrument the server for these network measurements.

Other approaches can use ICMP or other protocols to similarly implement these network measurement techniques as would now be apparent to one of ordinary skill in the art.

Additional Techniques for Measuring Available Bandwidth from a Server to a Client In one embodiment, measuring bandwidth from the server to the client can be determined by making the client download an object located in the server. In many cases, just using multiple TCP connections to download the object can provide a reasonable estimate of available bandwidth from the server to the client (e.g., configurable by user, number of TCP connections, or can use UDP traffic to simulate VOIP/video calls, etc., such as to send ten packets, etc.). However, in some cases, this value may not be as accurate as desired.

Use Case Scenario 1—Provisioning: Measure Traffic Volume in a Path

Figure 6:
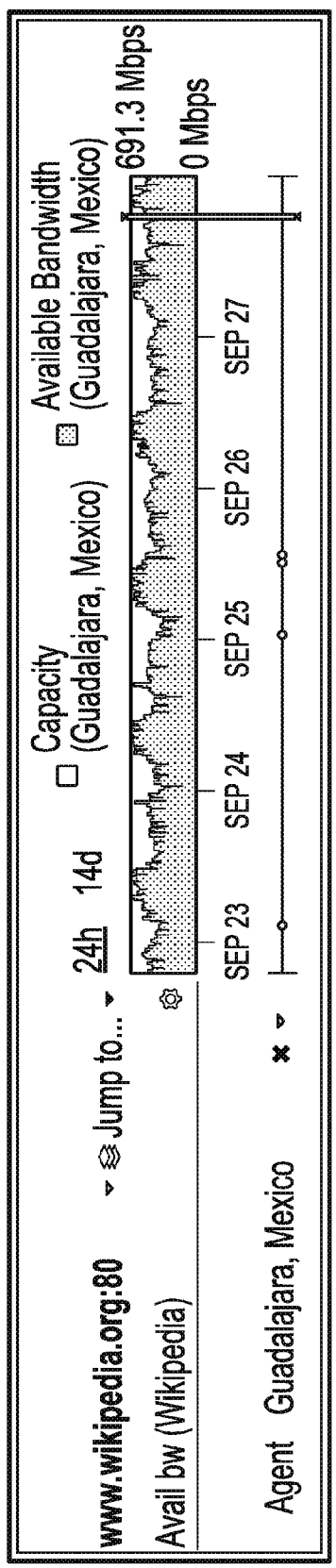
FIG. 6 illustrates an example timeline chart that shows the capacity and the available bandwidth on a path between an agent executed on a client and a server in accordance with some embodiments.

FIG. 6 illustrates an example timeline chart that shows the capacity (e.g., shown in a darker representation in the timeline chart) and the available bandwidth (e.g., shown in a lighter representation in the timeline chart) on a path between an agent executed on a client (e.g., located in Mexico) and a server (e.g., of www.wikipedia.com located in California) in accordance with some embodiments. As shown in the timeline chart, a 24-hour pattern where there is a decrease in available bandwidth starting at 8 am PDT, and an increase approximately 12 hours later at 8 pm PDT is indicated, which roughly aligns with the window where businesses are open in California. As also shown in the timeline chart is a local maximum of available bandwidth around 12 pm PDT, which coincides with lunch time in California. Accordingly, this information can be useful for understanding link utilization and understanding when to update the link capacity.

Use Case Scenario 2—Troubleshooting Poor Application Performance

Figure 7A:
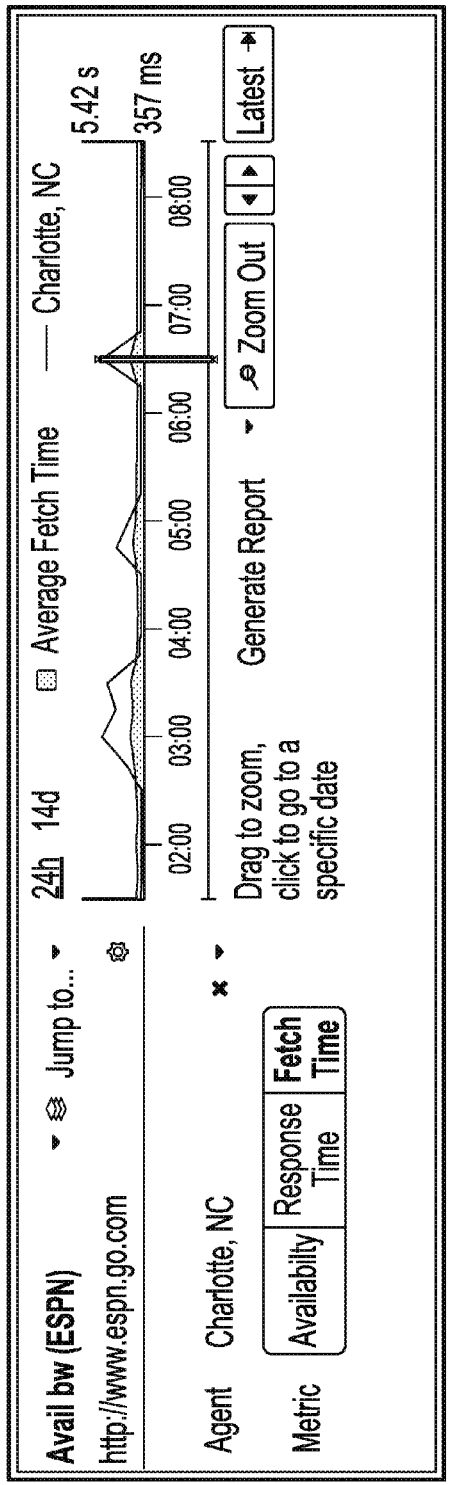
FIG. 7A illustrates an example of an HTTP test to a web site server in accordance with some embodiments.

FIG. 7A illustrates an example of an HTTP test to a web site server (e.g., www.espn.go.com as shown) in accordance with some embodiments. In particular, FIG. 7A illustrates a time series of fetch time of the index page.

Figure 7B:
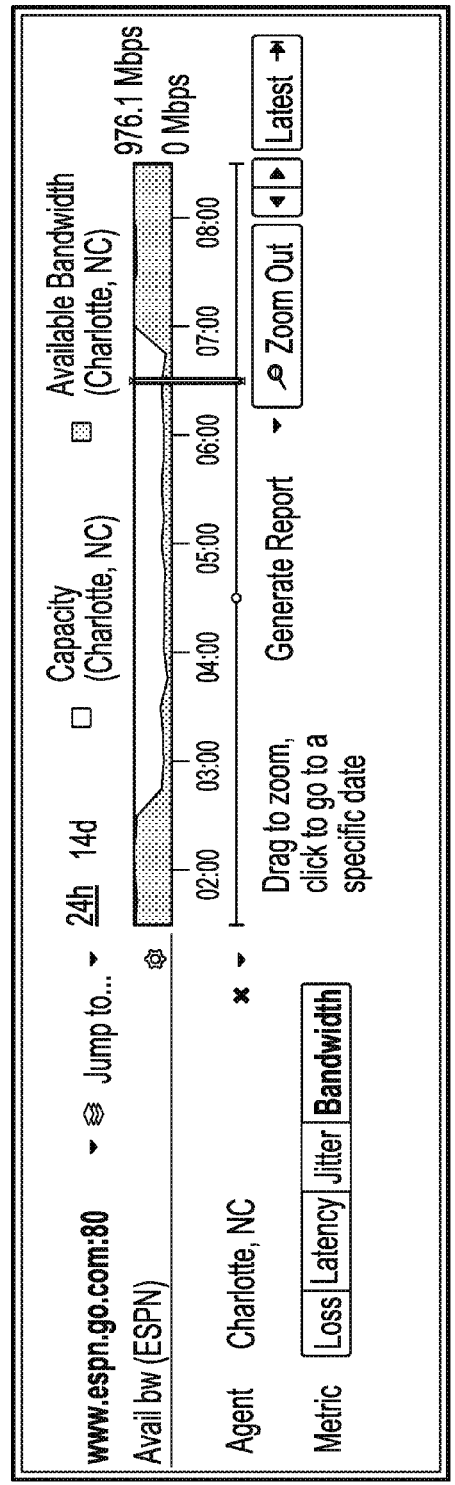
FIG. 7B illustrates an example of a time series of available bandwidth during the same time window in accordance with some embodiments.

FIG. 7B illustrates an example of a time series of available bandwidth during the same time window in accordance with some embodiments. Note the correlation between the increase in fetch time (e.g., almost 20× higher) to a drastic decrease in available bandwidth.

Figure 8:
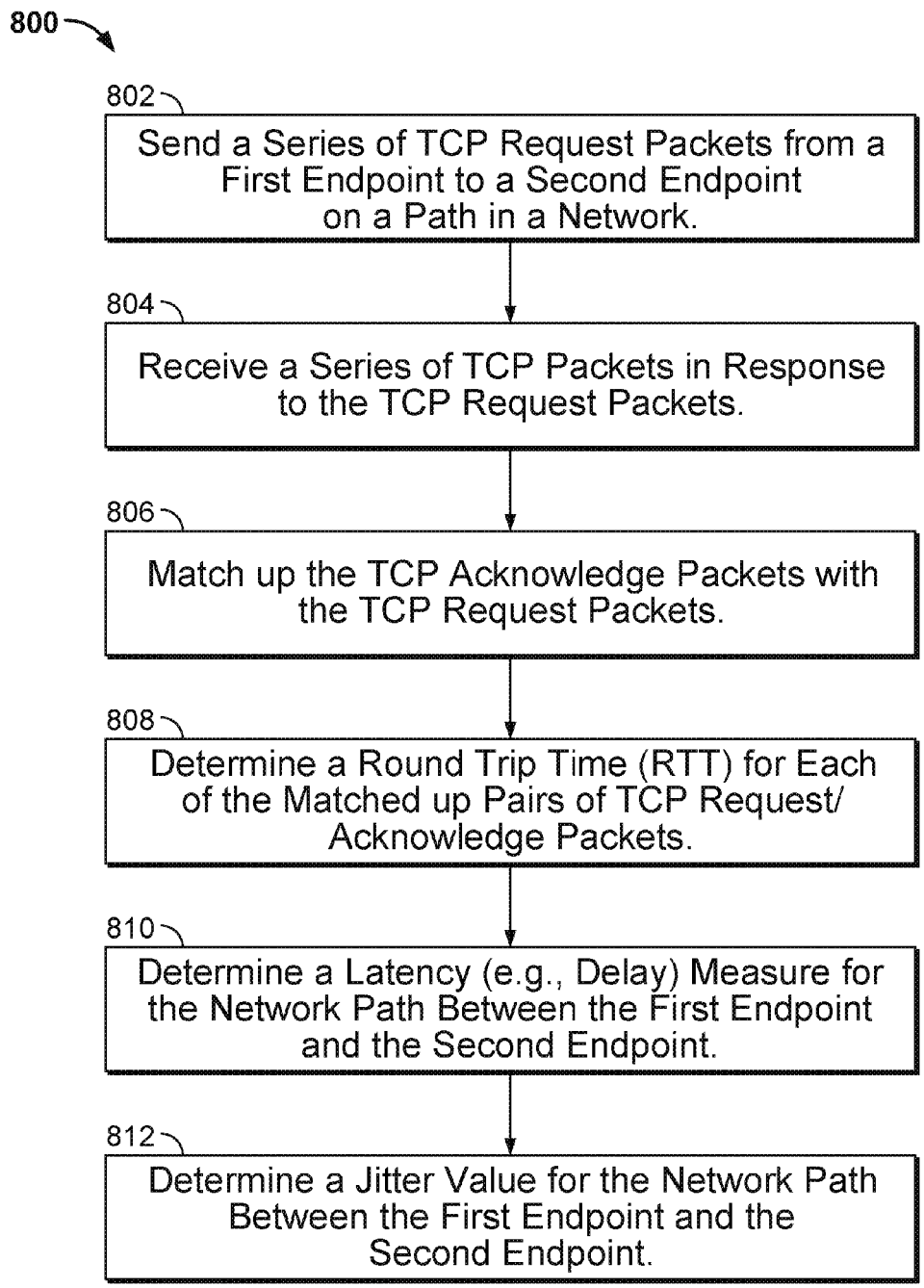
FIG. 8 is a flow diagram illustrating a process for measuring loss, delay, and jitter of a path in a network without server instrumentation in accordance with some embodiments.

Example Processes for Performing Network Measurements without Server Instrumentation FIG. 8 is a flow diagram illustrating a process for measuring loss, delay, and jitter of a path in a network without server instrumentation in accordance with some embodiments. In various embodiments, process 800 is performed by network measurements agent 304 executed on client (C) 302. The process begins at 802 by sending a series of TCP packets (e.g., a train of N packets, such as 50 packets) from a first endpoint to a second endpoint on a path in a network. For example, a client can send a series of TCP packets to a server, in which the server is not instrumented with a network measurement agent (e.g., TCP request (Req) packets can be sent from network measurements agent 304 using packet generator 330, executed on the client, such as similarly described above with respect to FIG. 3).

At 804, a series of TCP acknowledge responses is received in response to the TCP request packets (e.g., or data packets, such as shown in FIG. 4). If the target endpoint supports the Selective Acknowledgements (SACK) option (e.g., matching can be facilitated using the SACK option, by opening a hole in the series of TCP request packets sent at 802, such as not sending byte 1 as shown in and described above with respect to FIG. 4), then the above-described TCP SACK option is used to facilitate matching up the TCP acknowledge packets with the TCP request packets at 806.

As described above, packet loss, Round Trip Time (RTT), and jitter can then be measured based on the TCP acknowledge packets received in response to the series of TCP request packets. In one embodiment, loss for the network path can be determined by counting the number of missing acknowledged (ACK) packets (e.g., in which the number of expected ACK packets should equal the number of sent request (Req) packets), such as similarly described above. In an example implementation, loss counter 312 of network measurements engine 310 can compute the loss for the network path using packet generator 330 and packet receiver 340 to implement the above-described technique for determining loss for the network path.

At 808, a Round Trip Time (RTT) for each of the matched up pairs of TCP request/acknowledge packets is determined. In one embodiment, RTT for the network path between the first endpoint and the second endpoint can be measured using a local clock to measure the RTT for each TCP request packet and each matched up TCP acknowledged (ACK) packet using the above-described techniques for matching the request and ACK packets. For example, the RTT for each matched up packet can then be computed by calculating the difference in the time from when the acknowledged packet was received by the first endpoint from the time that the corresponding request packet was sent from the first endpoint. In this embodiment, the second endpoint is not instrumented, so the time at which request packets are received by the second endpoint and the time at which acknowledged packets are sent from the second endpoint are not known.

At 810, a latency (e.g., delay) measure for the network path between the first endpoint and the second endpoint is determined. In one embodiment, latency (e.g., delay) for the network path can then be determined by calculating the average RTT based on the measured RTT for each of the matched up packets. For example, assuming that 49 request/ACK TCP packets have been successfully matched up in which there was a loss of just 1 packet in a train of 50 request packets sent from the first endpoint to the second endpoint (e.g., from the client to the server, or vice-versa in some use case scenarios), then the latency is determined by computing the average calculated RTT, which is the average of the RTT for the matched up 49 request/ACK TCP packets in this example. In an example implementation, latency measurer 314 of network measurements engine 310 can compute the latency (e.g., delay) for the network path using packet generator 330, packet receiver 340, and clock 350 (e.g., clock 350 can obtain a local clock time for client (C) 302) to implement the above-described techniques for determining latency for the network path.

At 812, a jitter measure for the network path between the first endpoint and the second endpoint is determined. Packet jitter is generally computed as an average of the deviation from the network mean latency. In this example, jitter for the network path can then be calculated as the mean deviation of the RTT. In an example implementation, jitter calculator 316 of network measurements engine 310 can compute the jitter for the network path using the measured latency (e.g., measured using latency measurer 314, such as described above).

Figure 9:
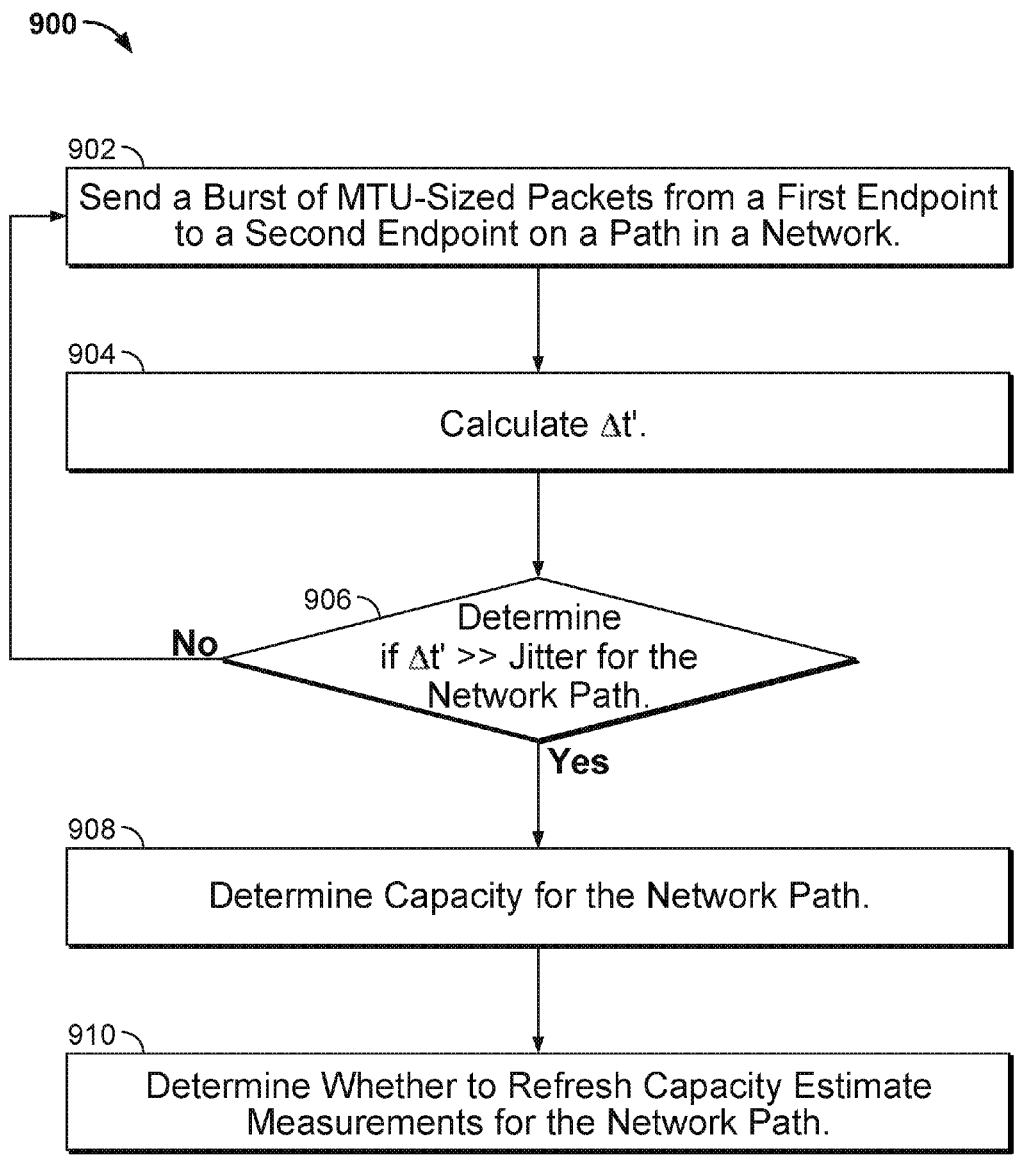
FIG. 9 is a flow diagram illustrating a process for estimating network capacity without server instrumentation in accordance with some embodiments.

FIG. 9 is a flow diagram illustrating a process for estimating network capacity without server instrumentation in accordance with some embodiments. In various embodiments, process 900 is performed by network measurements agent 304 executed on client (C) 302. The process begins at 902 by sending a burst of MTU-sized packets from a first endpoint to a second endpoint on a path in a network (e.g., in which the second endpoint, such as a server, is not instrumented with a network measurement agent). In one embodiment, a client-side technique to estimate capacity is performed by using a probe approach that includes sending a train of packets (e.g., initially 100 packets can be sent) of MTU size (e.g., 1460 bytes as discussed above), such as shown in FIG. 5. In an example implementation, after an initial TCP connection handshake to establish a TCP connection between a sender (e.g., the first endpoint, such as a client) and a receiver (e.g., the second endpoint, such as a server), a first number of packets, for example, 100 packets (e.g., or some other number of packets), can be sent from a sender (e.g., from the first endpoint to the second endpoint). The objective of sending a train of MTU-sized packets from the first endpoint to the second endpoint is to attempt to saturate the path in order to estimate a capacity measurement between the first endpoint and the second endpoint on this path of the network.

At 904, $\Delta t'$ is calculated. As discussed above, $\Delta t'$ is measured by subtracting $t_1'$ from $t_N'$ as shown, for example, in FIG. 5. In this example, $\Delta t'$ measures the difference in time that the first acknowledge (ACK) packet was received by the client (first endpoint) (e.g., as measured by the client's clock) and the time that the last ACK packet is received by the client (e.g., as measured by client's clock).

At 906, whether $\Delta t' \gg$ jitter for the network path is determined. As similarly described above, the rationale for preferring that the $\Delta t' \gg$ jitter for the network path is to ensure that the jitter on the network path does not have too significant of an impact on the $\Delta t'$ value that is measured using the above-described technique of sending, in this example, a burst of 100 MTU-sized packets (e.g., or some other number of packets) on the network path (e.g., does not distort or otherwise materially impact the result for the measured $\Delta t'$).

If the measured $\Delta t'$ exceeds the relative threshold such that $\Delta t' \gg$ jitter, then the train of 100 packets of MTU size was sufficient for computing the $\Delta t'$ value, and processing proceeds to 908. If not (e.g., $\Delta t'$ does not exceed the relative threshold), then processing returns to 902, at which a burst of a larger number of packets, such as 500 packets (e.g., or some other number of packets), can be sent and the above process can be repeated to measure a new $\Delta t'$ and verify that the $\Delta t'$ exceeds the relative threshold such that $\Delta t' \gg$ jitter. If the new $\Delta t'$ fails to exceed the relative threshold again, then the loop can be repeated and a train of a larger number of packets, such as 2000 packets (e.g., or some other number of packets), can be sent and the above process can be repeated to measure a new $\Delta t'$ and verify that the $\Delta t'$ exceeds the relative threshold such that $\Delta t' \gg$ jitter. In some cases, if the new $\Delta t'$ again fails to exceed the relative threshold, then it can be determined that there is too much jitter on this network path such that these client-side techniques may not be effectively applied for estimating capacity between this client and this server on this network path (e.g., as such number of packets and volume of data may be excessive for testing purposes, and/or can have other negative implications on network devices along the network path, etc.). In some cases, if jitter was determined to be high, then the above-described probing technique can be initiated with a higher number of packets for pre-optimization of this probing technique (e.g., start by sending a train of 500 packets of MTU size at 902 instead of initially sending a train of 100 packets of MTU size at 902).

At 908, a capacity estimate for the network path is determined. In one embodiment, capacity can be estimated using the below calculation: capacity=$(N \times MTU)/\Delta t'$, where N is the number of packets sent in the train of packets sent using the above-described probing technique (e.g., 100, 500, 2000, or some other values may be used as described above), MTU is the MTU size used for each of the packets in the above-described probing technique, and $\Delta t'$ is the value measured using the above-described probing technique as shown with respect to FIG. 5 and discussed above.

At 910, whether to refresh capacity estimate measurements for the network path is determined. In one embodiment, two windows are used to compute capacity: 1) a small window of 10 values typically spanning the last hour (e.g., referred to as hour capacity); and 2) a larger window of the last 24 hours (e.g., day capacity). For example, the 80-percentile can be computed on both windows (e.g., the $80^{th}$ percentile hour capacity and the $80^{th}$ percentile day capacity). If the ratio of the difference between the two is more than a threshold value (e.g., more than 50%), then the 24-hour window can be reset to start over (e.g., and maintain the small window). For example, the use of the small window can be used to filter some noise that can happen with the measurements, whereas the larger 24-hour window is useful to filter daily traffic patterns.

In an example implementation, capacity estimator 318 of network measurements engine 310 can implement these client-side techniques for estimating capacity of a path in a network using packet generator 330, packet receiver 340, and clock 350 (e.g., clock 350 can obtain a local clock time for client (C) 302), such as described above and further described below.

Figure 10:
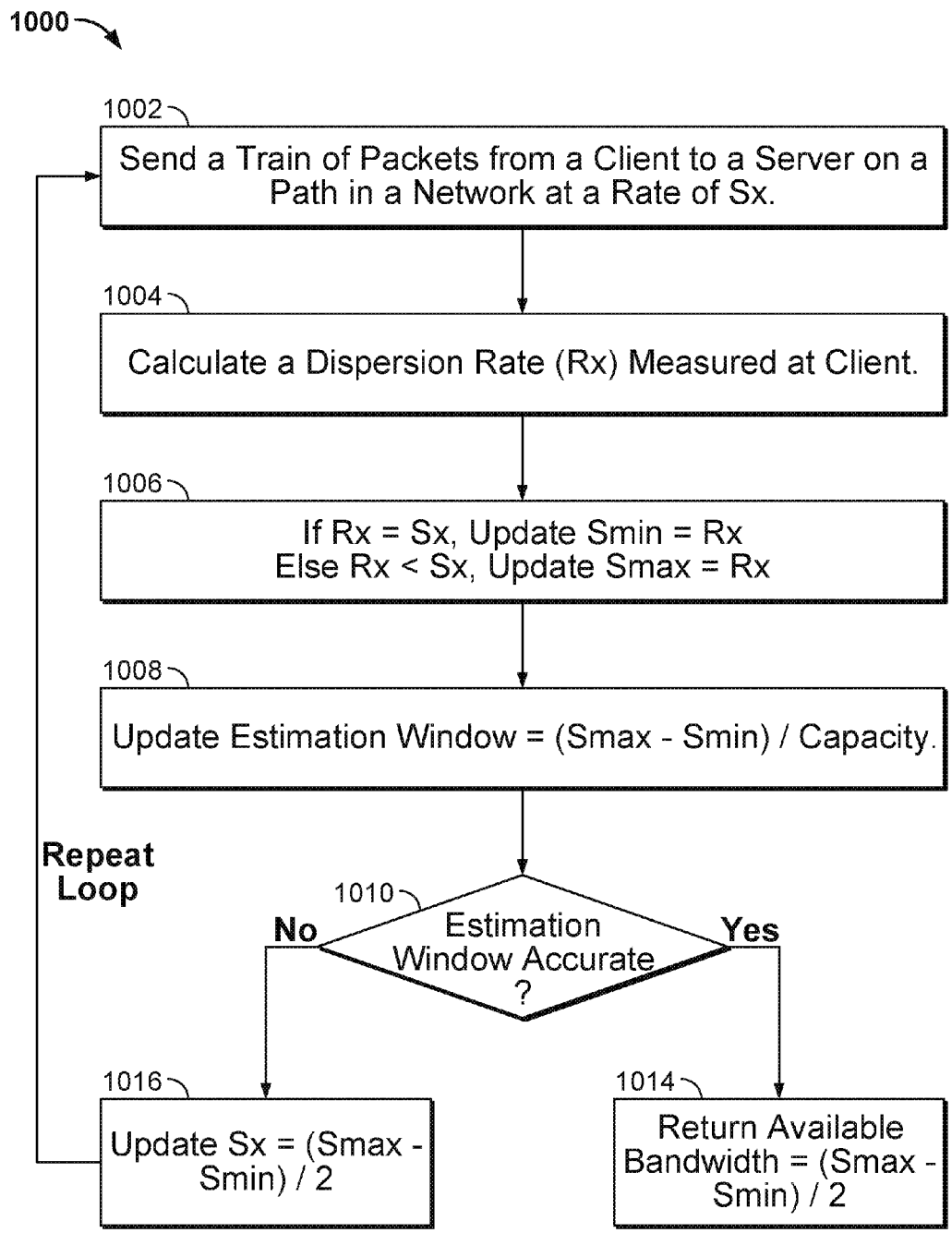
FIG. 10 is a flow diagram illustrating a process for estimating network bandwidth without server instrumentation in accordance with some embodiments.

FIG. 10 is a flow diagram illustrating a process for estimating network bandwidth of a network path from a server to a client without server instrumentation in accordance with some embodiments. In various embodiments, process 1000 is performed by network measurements agent 304 executed on client (C) 302. The process begins at 1002 by sending a train of packets from a client to a server on a path in a network at a rate of Sx (e.g., in which the server is not instrumented with a network measurement agent). In one embodiment, initial values of the following variables are set as follows: Smin is set to equal 0, Smax is set to equal capacity, and Sx is set to equal capacity, in which capacity is a previously measured capacity estimate value for the network path between the client and the server (e.g., capacity can be estimated for the network path using the above-described techniques).

At 1004, the dispersion rate (Rx) is measured at the client. As described above, the dispersion rate (Rx) refers to the rate at which response/acknowledge packets are received at the client from the server. In one embodiment, the dispersion rate is measured at the client using various techniques described above.

In one embodiment, at each iteration, the size of the train of packets is calculated based on the desired Sx and on how many network packets, this train of packets and cross-traffic (e.g., referred to as the target_traffic_window) can "fit" during the transmission of the sent train of packets (e.g., train_packets=(Sx/capacity)×target_traffic_window). As similarly described above, the approach used here is to calculate the minimum of packets a train should have so that given the rate at which is sent (Sx) there can be target_traffic_window packets (target window of packets) between the first and the last packets of the train. As an example, if the capacity rate is 500 Mbps and to allow for a window of 100 packets of traffic, to send the stream at capacity rate, the stream should contain 100 packets. On the other hand, if the stream is to be sent at 100 Mbps, then the stream should be composed of 20 packets, which will allow for 400 Mbps of cross-traffic.

At 1006, if the dispersion rate is equal to the rate at which the train of packets was sent from the client to the server on the network path (e.g., Rx=Sx), then Smin is updated to be set to equal Rx. Otherwise the dispersion rate is less than the rate at which the train of packets was sent from the client to the server on the network path (e.g., Rx<Sx), and Smax is updated to be set to equal Rx.

At 1008, an estimation window is updated. In one embodiment, the estimation window is updated to be set to equal (Smax−Smin)/Capacity, where capacity is the previously determined capacity estimate for the network path (e.g., estimated using the above-described capacity measurement techniques).

At 1010, whether the estimation window is accurate is determined. In one embodiment, the updated estimation window (e.g., updated at 1008) is compared to a threshold value (e.g., an accurate estimation window) to determine whether the updated estimation window is less than the threshold (e.g., determine whether updated estimation window<accurate estimation window). In one embodiment, the accurate estimation window is a threshold ratio of the capacity, such as ten percent.

If so (e.g., the updated estimation window<accurate estimation window), then an available bandwidth for the network path from the server to the client is estimated to equal (Smax−Smin)/2, as shown at 1014.

If not (i.e., the updated estimation window>=accurate estimation window), then Sx is updated to be set to equal (Smax−Smin)/2 as shown at 1016, and the loop is repeated and processing returns to 1002 as shown.

In some cases, the loop breaks if it has been run for more than a specified amount of time (e.g., 10 seconds) or if sending the next train of packets exceeds the maximum amount of allowed traffic (e.g., 5,000 packets). If the loop breaks and the estimation window is smaller than acceptable estimation window, then the current estimation (avail_bw=(Smax−Smin)/2) can be returned.

The above technique allows for a determination of the maximum rate at which packets can be sent from the client to the server such that the packets are returned at the same rate within an approximate estimate range (e.g., by recursively performing the above-described loop to determine this bandwidth estimate that is a threshold of, for example, within 10% of capacity).

As similarly discussed above with respect to capacity estimate measurements, these bandwidth estimate measurements can similarly be repeated over time, for example, every five minutes (e.g., or every one hour or some other time interval).

In an example implementation, bandwidth estimator 320 of network measurements engine 310 can implement these client-side techniques for estimating capacity of a path in a network using packet generator 330 and packet receiver 340.

These techniques can be applied to distributed applications (e.g., cloud-based or SaaS-based services) or other applications for which there is no access and/or cooperation to instrument the server for these network measurements.

Other approaches can use ICMP or other protocols to similarly implement these network measurement techniques as would now be apparent to one of ordinary skill in the art.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for estimating network capacity without server instrumentation, comprising:
a processor configured to:
send a burst of packets from a client to a server on a path in a network, wherein the burst of packets comprises a plurality of probe packets;
receive a plurality of acknowledgement packets from the server in response to the plurality of probe packets; and
determine a capacity estimate for the path in the network, wherein determine the capacity estimate for the path in the network comprises:
match up the plurality of acknowledgement packets that the client received from the server with the plurality of probe packets that the client sent to the server;
measure $\Delta t'$, wherein $\Delta t'$ measures a difference in a time (t1') that a first acknowledge packet is received at the client from the server and a time (tN') that a last acknowledge packet is received at the client from the server, wherein the t1' time and the tN' time are measured using a local clock of the client; and
estimate the capacity for the path in the network by calculating a total number of the probe packets that received a matching acknowledgement packet times a size of each of the probe packets divided by $\Delta t'$, wherein the size of each of the plurality of probe packets is equal to a Maximum Transmission Unit (MTU) size for the path in the network; and
a memory coupled to the processor and configured to provide the processor with instructions.

2. The system recited in claim 1, wherein determine the capacity estimate for the path in the network further comprises:
determine whether $\Delta t'$ exceeds a jitter for the path in the network by a threshold value; and
if $\Delta t'$ fails to exceed the jitter for the path in the network by the threshold value, then send another burst of packets that includes a greater number of packets than the initially sent burst of packets.

3. The system recited in claim 1, wherein the processor is further configured to:
generate a display output that includes the capacity estimate for the path in the network.

4. The system recited in claim 1, wherein the server supports a TCP Selective Acknowledgements (SACK) option, wherein the plurality of probe packets comprise a plurality of TCP data packets, wherein the plurality of acknowledgement packets comprise TCP ACK packets that are sent from the server in response to the plurality of TCP data packets, and wherein the TCP SACK option is used to facilitate the matching up the TCP data packets with SYN-ACK packets.

5. The system recited in claim 1, wherein the plurality of probe packets comprise TCP SYN packets, wherein the plurality of acknowledgement packets comprise TCP SYN-ACK packets that are sent from the server in response to TCP SYN packets, and wherein the TCP SYN packets are matched up with the TCP SYN-ACK packets using a 4-tuple comprising a source IP address, a destination IP address, a source port, and destination port associated with each of the TCP SYN packets and each of the TCP SYN-ACK packets.

6. The system recited in claim 1, wherein the plurality of probe packets comprise TCP SYN packets, wherein the plurality of acknowledgement packets comprise TCP RST packets that are sent from the server in response to TCP SYN packets, and wherein the TCP SYN packets are matched up with the TCP RST packets using a 4-tuple comprising a source IP address, a destination IP address, a source port, and destination port associated with each of the TCP SYN packets and each of the TCP RST packets.

7. A method of estimating network capacity without server instrumentation, comprising:
sending a burst of packets from a client to a server on a path in a network, wherein the burst of packets comprises a plurality of probe packets;
receiving a plurality of acknowledgement packets from the server in response to the plurality of probe packets; and
determining a capacity estimate for the path in the network, wherein determining the capacity estimate for the path in the network comprises:
matching up the plurality of acknowledgement packets that the client received from the server with the plurality of probe packets that the client sent to the server;
measuring $\Delta t'$, wherein $\Delta t'$ measures a difference in a time (t1') that a first acknowledge packet is received at the client from the server and a time (tN') that a last acknowledge packet is received at the client from the server, wherein the t1' time and the tN' time are measured using a local clock of the client; and
estimating the capacity for the path in the network by calculating a total number of the probe packets that received a matching acknowledgement packet times a size of each of the probe packets divided by $\Delta t'$, wherein the size of each of the plurality of probe packets is equal to a Maximum Transmission Unit (MTU) size for the path in the network.

8. The method of claim 7, wherein determining the capacity estimate for the path in the network further comprises:
determining whether $\Delta t'$ exceeds a jitter for the path in the network by a threshold value; and
if $\Delta t'$ fails to exceed the jitter for the path in the network by the threshold value, then sending another burst of packets that includes a greater number of packets than the initially sent burst of packets.

9. The method of claim 7, wherein the server supports a TCP Selective Acknowledgements (SACK) option, wherein the plurality of probe packets comprise a plurality of TCP data packets, wherein the plurality of acknowledgement packets comprise TCP ACK packets that are sent from the server in response to the plurality of TCP data packets, and wherein the TCP SACK option is used to facilitate the matching up the TCP data packets with SYN-ACK packets.

10. The method of claim 7, wherein the plurality of probe packets comprise TCP SYN packets, wherein the plurality of acknowledgement packets comprise TCP SYN-ACK packets that are sent from the server in response to TCP SYN packets, and wherein the TCP SYN packets are matched up with the TCP SYN-ACK packets using a 4-tuple comprising a source IP address, a destination IP address, a source port, and destination port associated with each of the TCP SYN packets and each of the TCP SYN-ACK packets.

11. The method of claim 7, wherein the plurality of probe packets comprise TCP SYN packets, wherein the plurality of acknowledgement packets comprise TCP RST packets that are sent from the server in response to TCP SYN packets, and wherein the TCP SYN packets are matched up with the TCP RST packets using a 4-tuple comprising a source IP address, a destination IP address, a source port, and destination port associated with each of the TCP SYN packets and each of the TCP RST packets.

12. A computer program product for estimating network capacity without server instrumentation, the computer program product being embodied in a non-transitory tangible computer readable storage medium and comprising computer instructions for:
sending a burst of packets from a client to a server on a path in a network, wherein the burst of packets comprises a plurality of probe packets;
receiving a plurality of acknowledgement packets from the server in response to the plurality of probe packets; and
determining a capacity estimate for the path in the network, wherein determining the capacity estimate for the path in the network comprises:
matching up the plurality of acknowledgement packets that the client received from the server with the plurality of probe packets that the client sent to the server;
measuring Δt', wherein Δt' measures a difference in a time (t1') that a first acknowledge packet is received at the client from the server and a time (tN') that a last acknowledge packet is received at the client from the server, wherein the t1' time and the tN' time are measured using a local clock of the client; and
estimating the capacity for the path in the network by calculating a total number of the probe packets that received a matching acknowledgement packet times a size of each of the probe packets divided by Δt', wherein the size of each of the plurality of probe packets is equal to a Maximum Transmission Unit (MTU) size for the path in the network.

13. The computer program product recited in claim 12, wherein the server supports a TCP Selective Acknowledgements (SACK) option, wherein the plurality of probe packets comprise a plurality of TCP data packets, wherein the plurality of acknowledgement packets comprise TCP ACK packets that are sent from the server in response to the plurality of TCP data packets, and wherein the TCP SACK option is used to facilitate the matching up the TCP data packets with SYN-ACK packets.

14. The computer program product recited in claim 12, wherein the plurality of probe packets comprise TCP SYN packets, wherein the plurality of acknowledgement packets comprise TCP SYN-ACK packets that are sent from the server in response to TCP SYN packets, and wherein the TCP SYN packets are matched up with the TCP SYN-ACK packets using a 4-tuple comprising a source IP address, a destination IP address, a source port, and destination port associated with each of the TCP SYN packets and each of the TCP SYN-ACK packets.

15. The computer program product recited in claim 12, wherein the plurality of probe packets comprise TCP SYN packets, wherein the plurality of acknowledgement packets comprise TCP RST packets that are sent from the server in response to TCP SYN packets, and wherein the TCP SYN packets are matched up with the TCP RST packets using a 4-tuple comprising a source IP address, a destination IP address, a source port, and destination port associated with each of the TCP SYN packets and each of the TCP RST packets.

16. A system for estimating network bandwidth without server instrumentation, comprising:
a processor configured to:
send a train of packets from a client to a server on a path in a network, wherein the train of packets comprises a plurality of probe packets of a Maximum Transmission Unit (MTU) size, wherein the train of packets is sent from the client to the server at a rate of Sx, and wherein Smin is initially set to equal zero;
receive a plurality of acknowledgement packets from the server in response to the plurality of probe packets; and
determine an available bandwidth estimate for the path in the network from the server to the client, wherein determine the available bandwidth estimate for the path in the network from the server to the client comprises:
calculate a dispersion rate (Rx) measured at the client;
determine whether Rx equals Sx, and if so, update Smin to be set to equal Rx, and if not, then update Smax to be set to equal Rx;
update an estimation window to be set to equal (Smax−Smin)/capacity, wherein the capacity is a capacity estimate for the path in the network;
if an estimation window is less than a threshold value, then return the available bandwidth estimate for the path in the network, wherein the available bandwidth is calculated to equal (Smax−Smin)/2; and
if the estimation window is not less than the threshold value, update Sx to be set to equal (Smax−Smin)/2 and send another train of packets from the client to the server on the path in the network at the updated Sx rate; and
a memory coupled to the processor and configured to provide the processor with instructions.

17. The system recited in claim 16, wherein the processor is further configured to:
generate a display output that includes the available bandwidth estimate for the path in the network.

18. A method of estimating network bandwidth without server instrumentation, comprising:
sending a train of packets from a client to a server on a path in a network, wherein the train of packets comprises a plurality of probe packets of a Maximum Transmission Unit (MTU) size, wherein the train of packets is sent from the client to the server at a rate of Sx, and wherein Smin is initially set to equal zero;
receiving a plurality of acknowledgement packets from the server in response to the plurality of probe packets; and
determining an available bandwidth estimate for the path in the network from the server to the client, wherein determining the available bandwidth estimate for the path in the network from the server to the client comprises:
calculating a dispersion rate (Rx) measured at the client;
determining whether Rx equals Sx, and if so, update Smin to be set to equal Rx, and if not, then updating Smax to be set to equal Rx;
updating an estimation window to be set to equal (Smax−Smin)/capacity, wherein the capacity is a capacity estimate for the path in the network;
if an estimation window is less than a threshold value, then returning the available bandwidth estimate for the path in the network, wherein the available bandwidth is calculated to equal (Smax−Smin)/2; and if the estimation window is not less than the threshold value, updating Sx to be set to equal (Smax−Smin)/2 and sending another train of packets from the client to the server on the path in the network at the updated Sx rate.

19. A computer program product for estimating network bandwidth without server instrumentation, the computer program product being embodied in a non-transitory tangible computer readable storage medium and comprising computer instructions for:

sending a train of packets from a client to a server on a path in a network, wherein the train of packets comprises a plurality of probe packets of a Maximum Transmission Unit (MTU) size, wherein the train of packets is sent from the client to the server at a rate of Sx, and wherein Smin is initially set to equal zero;

receiving a plurality of acknowledgement packets from the server in response to the plurality of probe packets; and determining an available bandwidth estimate for the path in the network from the server to the client, wherein determining the available bandwidth estimate for the path in the network from the server to the client comprises:

calculating a dispersion rate (Rx) measured at the client;

determining whether Rx equals Sx, and if so, update Smin to be set to equal Rx, and if not, then updating Smax to be set to equal Rx;

updating an estimation window to be set to equal (Smax−Smin)/capacity, wherein the capacity is a capacity estimate for the path in the network;

if an estimation window is less than a threshold value, then returning the available bandwidth estimate for the path in the network, wherein the available bandwidth is calculated to equal (Smax−Smin)/2; and if the estimation window is not less than the threshold value, updating Sx to be set to equal (Smax−Smin)/2 and sending another train of packets from the client to the server on the path in the network at the updated Sx rate.

\* \* \* \* \*